United States Patent
Asai

[19]

[11] Patent Number: 6,129,059
[45] Date of Patent: Oct. 10, 2000

[54] 2-STROKE CYCLE INTERNAL COMBUSTION ENGINE

[75] Inventor: Masahiro Asai, Wako, Japan

[73] Assignee: Honda Giken Kogyo Kabushiki Kaisha, Tokyo, Japan

[21] Appl. No.: 09/189,812

[22] Filed: Nov. 12, 1998

[30] Foreign Application Priority Data

Nov. 12, 1997 [JP] Japan .................................. 9-310247

[51] Int. Cl.[7] .............................. F01N 3/20; F02B 21/02
[52] U.S. Cl. .................................. 123/65 PE; 123/65 A; 60/314
[58] Field of Search ........................ 123/65 PE, 65 A, 123/65 V; 422/179; 60/314, 312, 301

[56] References Cited

U.S. PATENT DOCUMENTS

| 5,376,341 | 12/1994 | Gulati .................................. 422/179 |
| 5,645,018 | 7/1997 | Ishibashi et al. ..................... 123/65 A |
| 5,752,476 | 5/1998 | Nakamura ............................ 123/65 PE |

FOREIGN PATENT DOCUMENTS 5302521  11/1993  Japan .

Primary Examiner—Willis R. Wolfe
Assistant Examiner—Hyder Ali
Attorney, Agent, or Firm—Birch, Stewart, Kolasch & Birch, LLP

[57] ABSTRACT

To provide a 2-stroke cycle internal combustion engine for a vehicle in which less blowoff of a gas mixture occurs in a combustion chamber, fuel consumption is low and high exhaust gas purifying performance is attained. The cylinder of the internal combustion engine is slightly inclined toward the forward side of the vehicle body from its upright position. The high pressure chamber and the communication passages are arranged forwardly toward the vehicle body from the cylinder. Openings of the communicating passages toward the combustion chamber are arranged, from the scavenging port, near the combustion chamber. The intake control valve rotated from the crank chamber near the openings of the communicating passages toward the combustion chamber is arranged near the openings of the communicating passages, and the exhaust pipe and the exhaust expansion chamber communicating with the exhaust gas passage of the internal combustion engine are arranged at a rear part of the vehicle body from the cylinder.

19 Claims, 7 Drawing Sheets

2-STROKE CYCLE INTERNAL COMBUSTION ENGINE

BACKGROUND OF THE INVENTION

1. Field of the Invention

This invention relates to a 2-stroke cycle internal combustion engine for a vehicle in which a lower amount of blowoff of a gas mixture within a combustion chamber is experienced, fuel consumption is low and exhaust purifying performance is high.

2. Description of Related Art

In the related art 2-stroke cycle internal combustion engine, fuel supplied by a carburetor or the like is mixed with intake air and the gas mixture is sucked into the crank chamber. The gas mixture is supplied into the combustion chamber through the scavenging opening, and a releasing time of the exhaust opening is set faster than a releasing time of the scavenging opening (the upper edge of the opening of the exhaust opening is placed nearer than that of the opening edge of the scavenging opening), resulting in the gas mixture supplied into the combustion chamber being discharged to produce blowoff easily.

Although this blowoff is restricted under an effect of exhaust pulsation movement at the exhaust expansion chamber, its restriction is difficult over the entire operating range, resulting in fuel consumption and influence of the exhaust purifing performance.

In order to solve this problem, there was provided a 2-stroke cycle internal combustion engine disclosed in the official gazette of Japanese Patent Laid-Open No. Hei 5-302521. In the 2-stroke cycle internal combustion engine described in the official gazette of Japanese Patent Laid-Open No. Hei 5-302521, the chamber is arranged near the crankcase and the cylinder block, the intake control valve is placed between the crank chamber and the chamber, the scavenging control valve is placed between the chamber and the combustion chamber, and there is provided a fuel injection valve for use in injecting fuel into the chamber.

In addition, there was provided a 2-stroke cycle internal combustion engine in which an exhaust expansion chamber for restricting blowoff were arranged with an exhaust purifying catalyst device. (See the official gazette of Japanese Utility Model Laid-Open No. Hei 3-127017).

In the 2-stroke cycle internal combustion engine described in the official gazette of Japanese Patent Laid-Open No. Hei 5-302521, all of the intake air in the crank chamber are fed into the chamber through an intake control valve. Furthermore, the air flows into the combustion chamber through the scavenging control valve under a state in which it is mixed with fuel injected from the fuel injection valve into the chamber. Air may not flow from within the crank chamber into the combustion chamber through the scavenging opening, so that blowoff is not be avoided. Although an upstream side port of the scavenging control valve is opened at the lower part of the chamber, it is not the lowest part. Therefore, there is a disadvantage in that fuel injected into the chamber is accumulated at the bottom part of the chamber. As a result, the amount of fuel supplied into the combustion chamber can not be accurately controlled and a response characteristic is poor.

In the 2-stroke cycle internal combustion engine having an exhaust purifying catalyst device disclosed in Japanese Utility Model Laid-Open No. Hei 3-127017, the exhaust expansion chamber has a large capacity, resulting in a motorcycle having an exhaust port arranged at a more forward part of the vehicle body than the combustion chamber. An upstream side opening of the exhaust expansion chamber was connected to the exhaust pipe at the front part of the vehicle body. Furthermore, the exhaust expansion chamber having a larger diameter bypassed below or at a side part of the internal combustion engine and extended to a rearward part of the vehicle body. Thus, an increased minimum ground height and width of the vehicle could not be avoided.

SUMMARY OF THE INVENTION

This invention relates to an improved 2-stroke cycle internal combustion engine which eliminates such disadvantages as described above. The 2-stroke cycle internal combustion engine of the present invention includes a communicating passage communicating a combustion chamber with a high pressure chamber. An intake control valve controls the communicating passage so that it may be opened or closed. Fuel is supplied from a fuel supplying device to the combustion chamber through the communicating passage and the intake control valve. Furthermore, the engine is mounted on a saddle riding type vehicle with its crankshaft being directed toward a width direction of the vehicle. The present invention is characterized by a cylinder of the internal combustion engine being slightly inclined from its upright position toward a forward side of the vehicle body. The high pressure chamber and the communicating passage are arranged from said cylinder to the forward part of the vehicle body. An opening of the communicating passage to the combustion chamber is arranged nearer to a top dead center position than a scavenging port. The intake control valve is arranged near an opening of the communicating passage. Furthermore, both an exhaust pipe communicated with an exhaust passage of the internal combustion engine and an exhaust expansion chamber are arranged more rearward of the vehicle body than the cylinder.

In the present invention, since the opening of the communicating passage into the combustion chamber is arranged near the top dead center rather than the scavenging port, and fuel is supplied from the fuel supplying device through the communicating passage and the intake control valve, the air not containing any fuel is fed into the combustion chamber through the scavenging passage during a scavenging suction process, ignited gas in the combustion chamber is discharged out of the exhaust opening and the scavenging passage is closed. Thereafter, the fuel is supplied into the combustion chamber through the communicating pipe. Accordingly, the blowoff of the gas mixture in the combustion chamber is prohibited and the discharge of unburned gas is restricted. Furthermore, under a low load state, a scavenging efficiency caused by scavenging with air is improved.

In addition, the cylinder of the internal combustion engine is inclined slightly forwardly toward the vehicle body from its upright position and the intake control valve is arranged near the opening of the communicating passage, so that a distance from the high pressure chamber to the combustion chamber is shortened and the fuel and the high pressure gas are supplied smoothly to the combustion chamber. As a result, the amount of fuel supplied is properly controlled and a high responding characteristic is attained, leading to a stable combustion state.

In addition, since the exhaust pipe communicated with the exhaust passage of the internal combustion engine and the exhaust expansion chamber are arranged more rearward of the vehicle body than the cylinder, the exhaust systems are not extended along either the lateral side or the vertical side of the internal combustion engine toward the rearward side of the vehicle body. Therefore an increase of the vehicle width or vehicle height can be prevented in advance, a small-sized saddle riding type vehicle can be attained, and riding comfort can be improved.

Furthermore, according to the present invention, it is possible to use running air for the intake system of the internal combustion engine, cool the engine, and therefore improve filling efficiency.

Furthermore, since the exhaust system having a relative large cross sectional area is arranged at the rear part of the internal combustion engine, it is possible to prevent the vehicle width or vehicle height from being increased.

In addition, since the exhaust pipe occupying almost all of the entire length of the exhaust system is bypassed near the muffler, it is possible to increase the entire length of the exhaust system to attain a sufficient realization of the exhaust inertia effect.

Furthermore, since the exhaust pipe occupying almost of an entire length of the exhaust system is bypassed near the muffler, it is possible to attain a sufficient realization of the exhaust inertia effect.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE PREFERRED EMBODIMENTS

Figure 1:
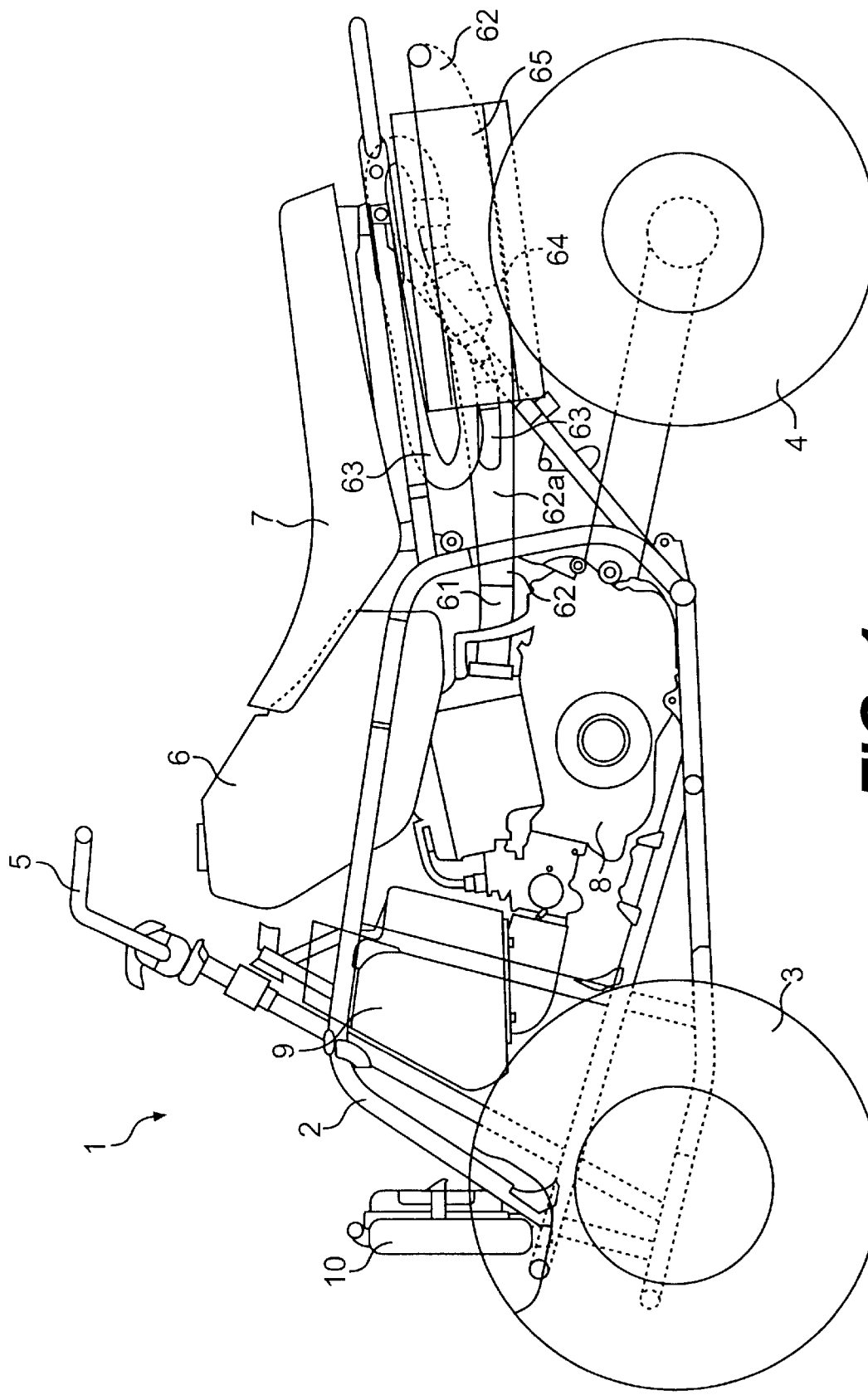
FIG. 1 is a side elevational view illustrating an off-road running saddle riding type vehicle having the 2-stroke cycle internal combustion engine of the present invention.
Figure 2:
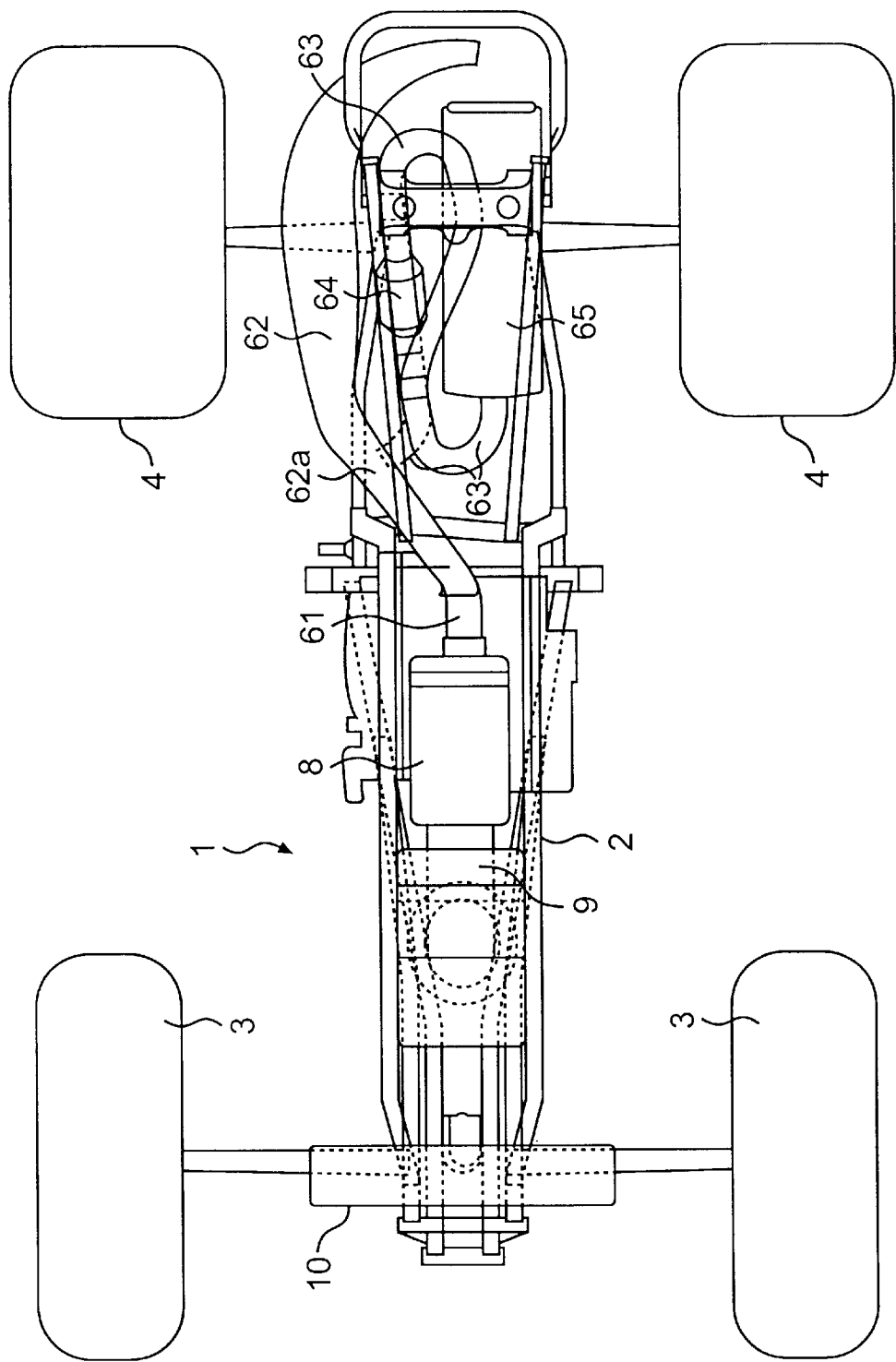
FIG. 2 is a top plan view illustrating a substantial part of FIG. 1.

Referring now to FIGS. 1 to 9, a preferred embodiment of the present invention will be described. An off-road running saddle riding type vehicle 1 or buggy vehicle shown in FIGS. 1 and 2 is provided with a front wheel 3 and a rear wheel 4 having a pair of right and left balloon type low pressure fires at a forward side and a rearward side of the vehicle body frame 2.

A steering handle 5, a fuel tank 6 and a seat 7 are arranged in sequence on the forward upper part of the off-road running saddle riding type vehicle 1 from a forward side to a rearward side. A single cylinder 2-stroke cycle internal combustion engine 8 is positioned below the fuel tank 6 and seat 7 and is mounted at a substantial central part of the vehicle frame 2. An air cleaner 9 and a radiator 10 are arranged and positioned on the vehicle body frame 2 in front of the single cylinder 2-stroke cycle internal combustion engine 8.

Figure 3:
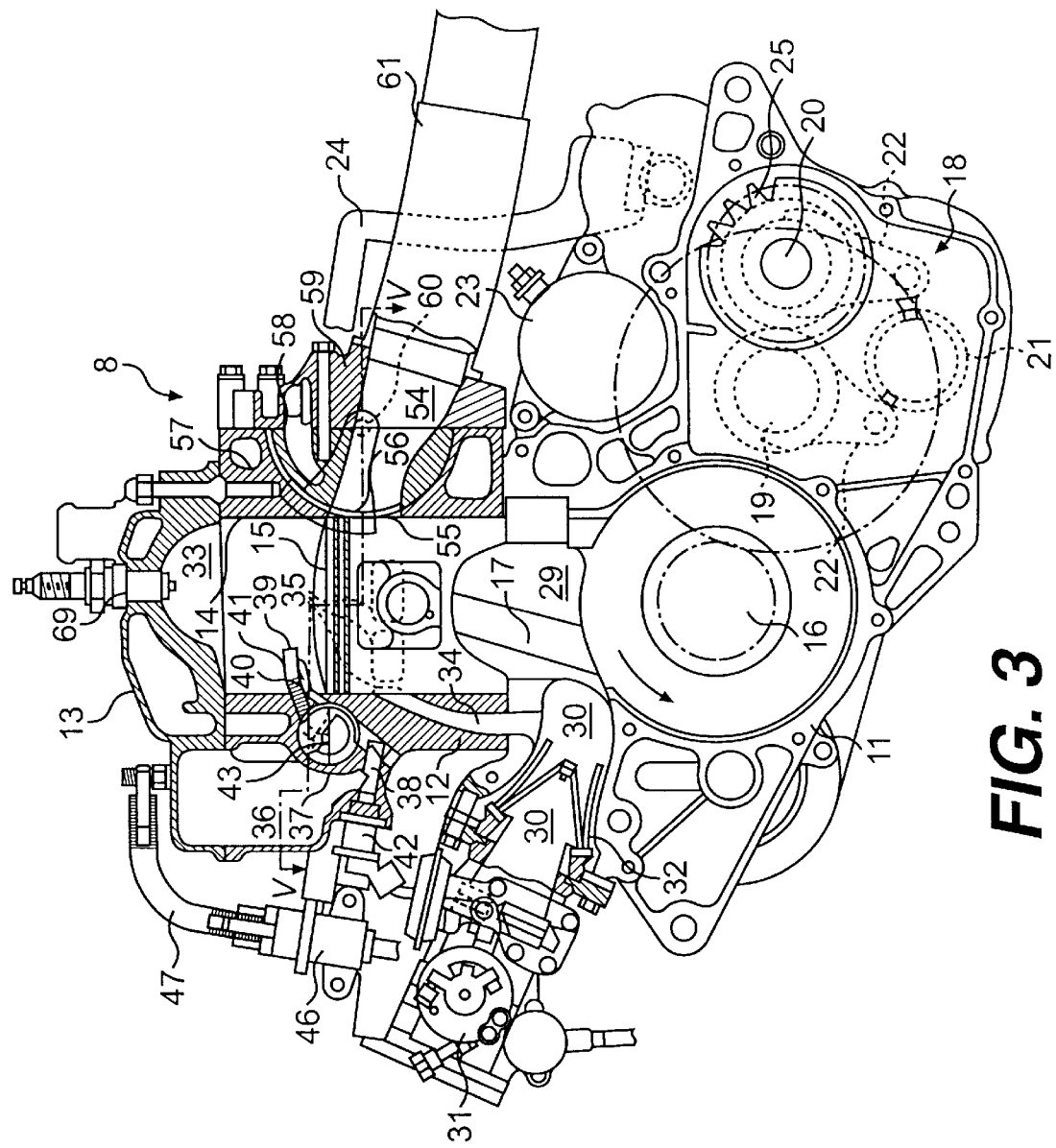
FIG. 3 is a left side elevational view in longitudinal section illustrating a substantial part of the internal combustion engine of FIG. 1.

Furthermore, as shown in FIG. 3, in the single cylinder 2-stroke cycle internal combustion engine 8, the cylinder block 12 and the cylinder head 13 overlap on the crankcase 11, are divided into two right and left segments, and are integrally connected to each other. The cylinder 14 of the cylinder block 12 is inclined slightly from the vertical upper part toward the front side of the vehicle body. The piston 15 is fitted into the cylinder 14 so that it may be reciprocated up and down.

In addition, the crankshaft 16 is directed toward a width direction of the vehicle and rotatably pivoted in the crankcase 11. The piston 15 and the crankshaft 16 are connected by the connecting rod 17 and the crankshaft 16 is rotationally driven in a counter-clockwise direction as viewed in FIG. 3 in correspondence with a rise and descent of the piston 15.

Furthermore, a main shaft 19 and a counter-shaft 20 of a gear transmission device 18 positioned more rearwardly than the crankshaft 16 are rotatably pivoted at the crankcase 11. The main shaft 19 is provided with a frictional multi-plate clutch (not shown). A shift drum 21 of a transmission operating mechanism is pivotally supported below the main shaft 19 and the counter shaft 20. A shifting member 22 is fitted into a guiding groove of the shift drum 21. As the shift drum 21 is rotated by a desired angle, the shifting member 22 is moved axially. Furthermore, the gears arranged at the main shaft 19 and the counter shaft 20 are selectively engaged with each other and changed in speed to a desired transmission ratio.

In addition, a starter motor 23 and a kick lever 24 are arranged above the main shaft 19 and the counter-shaft 20. In the case where the single 2-stroke cycle internal combustion engine 8 is not started even if the crankshaft 16 is rotated by the kick lever at the time of starting, the single cylinder 2-stroke cycle internal combustion engine 8 is started by the starter motor 23.

Furthermore, the drive sprocket 25 is fitted to the right end of the counter-shaft 20. A chain (not illustrated) is applied to the drive sprocket 25 and a driven sprocket (not shown) integral with the rear wheel 4. The rear wheel 4 is rotationally driven in correspondence with a rotation of the counter-shaft 20.

Figure 4:
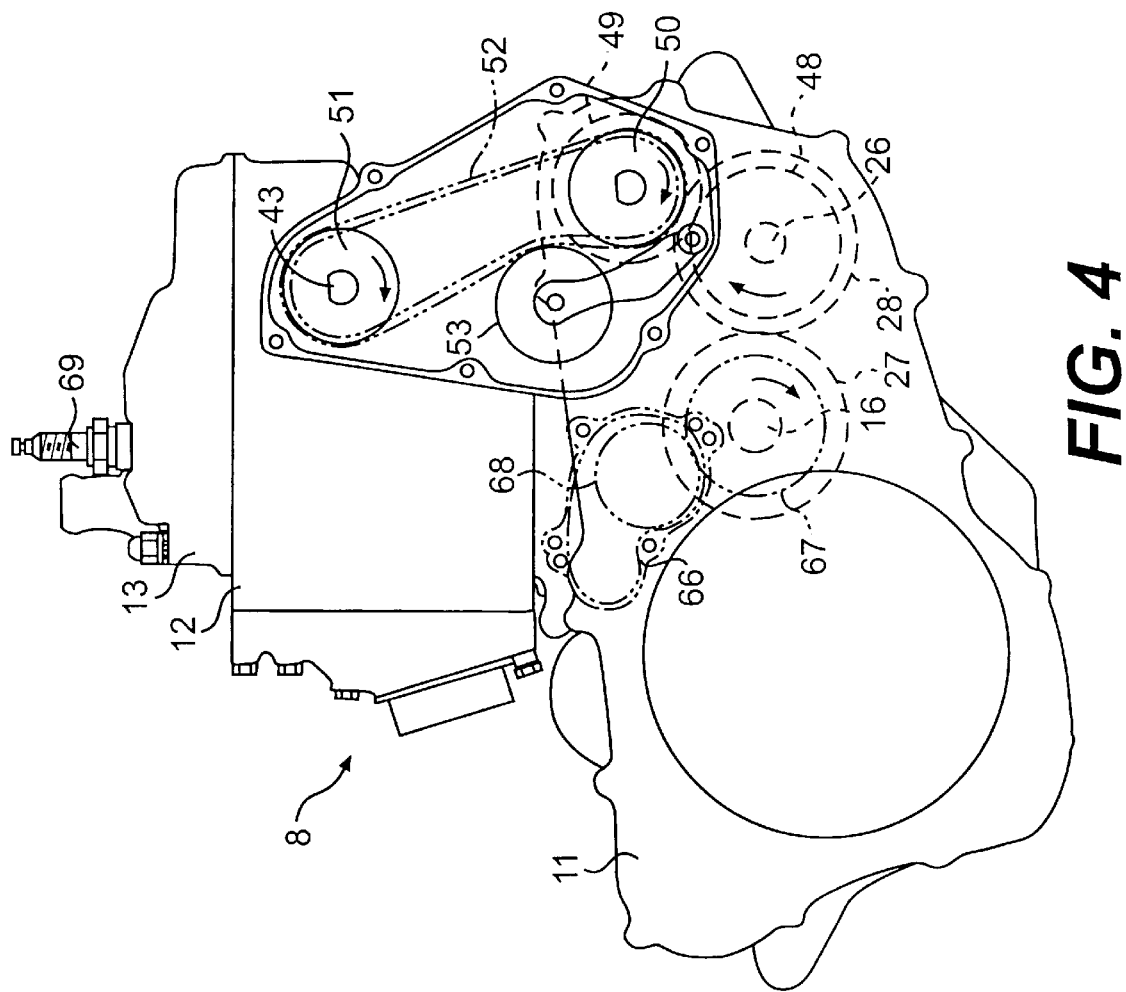
FIG. 4 is a right side elevational view illustrating the internal combustion engine of FIG. 1.

Additionally, as shown in FIG. 4, the balancer 26 for eliminating a primary inertia force of the crankshaft 16 is rotatably pivoted to the crankcase 11, in parallel with the crankshaft 16. The balancer drive gear 27 and the balancer driven gear 28 having the same diameter and the same number of teeth are fitted to the right ends of the crankshaft 16. The balancer 26, the balancer drive gear 27 and the balancer driven gear 28 are engaged with each other, and the balancer 26 is rotationally driven at the same rotational speed in an opposite direction to the rotating direction of the crankshaft 16.

Furthermore, a suction passage 30 communicating with the crank chamber 29 of the crankcase 11 is formed at the forward side of the vehicle body. An upstream side end of the suction passage 30 is connected to the air cleaner 9. A throttle valve 31 and a reed valve 32 are arranged in series in the suction passage 30, the throttle valve 31 is connected to a throttle grip (not shown) through a communicating means (not shown). As the throttle grip is twisted in one direction, a degree of opening of the throttle valve 31 is increased.

Figure 10:
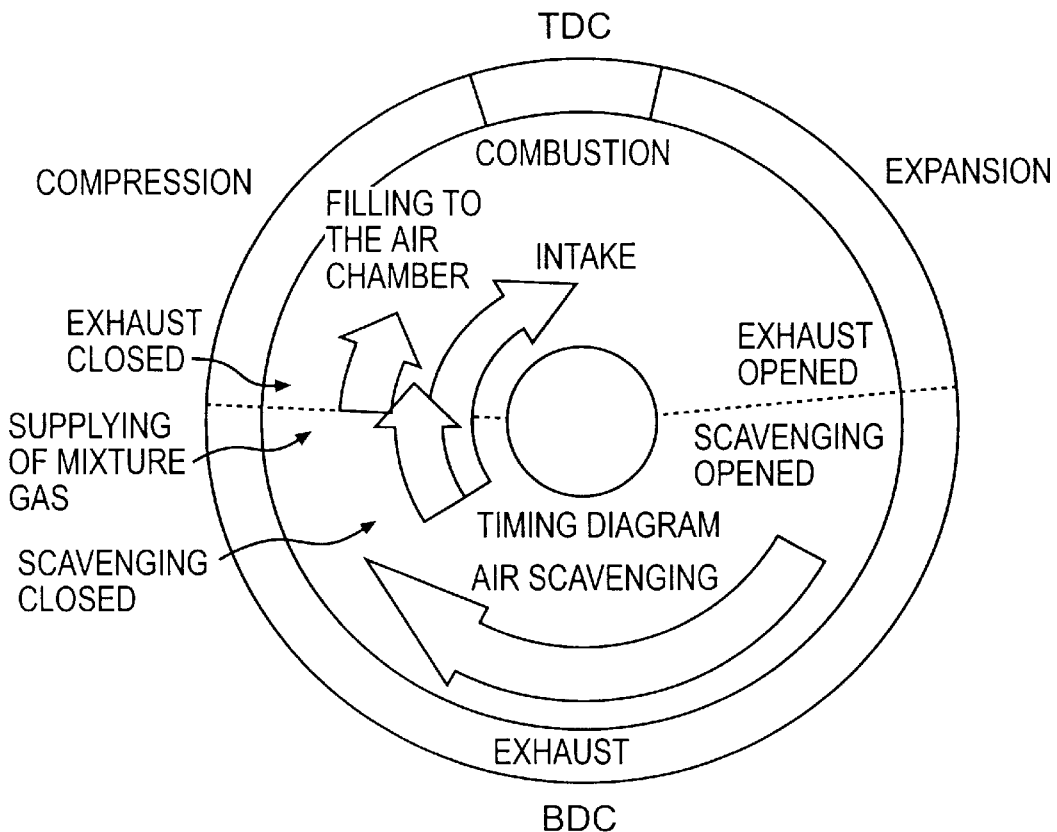
FIG. 10 is an schematic view illustrating an operation cycle of the present invention.

In addition, a total number of five scavenging passages, i.e. two pairs of scavenging passages 34 communicating the crank chamber 29 of the crankcase 11 with the upper end combustion chamber 33 of the cylinder 14 at both sides of the vehicle body and one scavenging passage 34 at the forward side of the vehicle body, are formed at the cylinder 14. The scavenging opening 35 of the scavenging passage 34 is arranged slightly near a bottom dead center position of an intermediate part between the top dead center and the bottom deed center positions. An opening or closing timing of the scavenging passage 34 is set as shown in FIG. 10.

Figure 5:
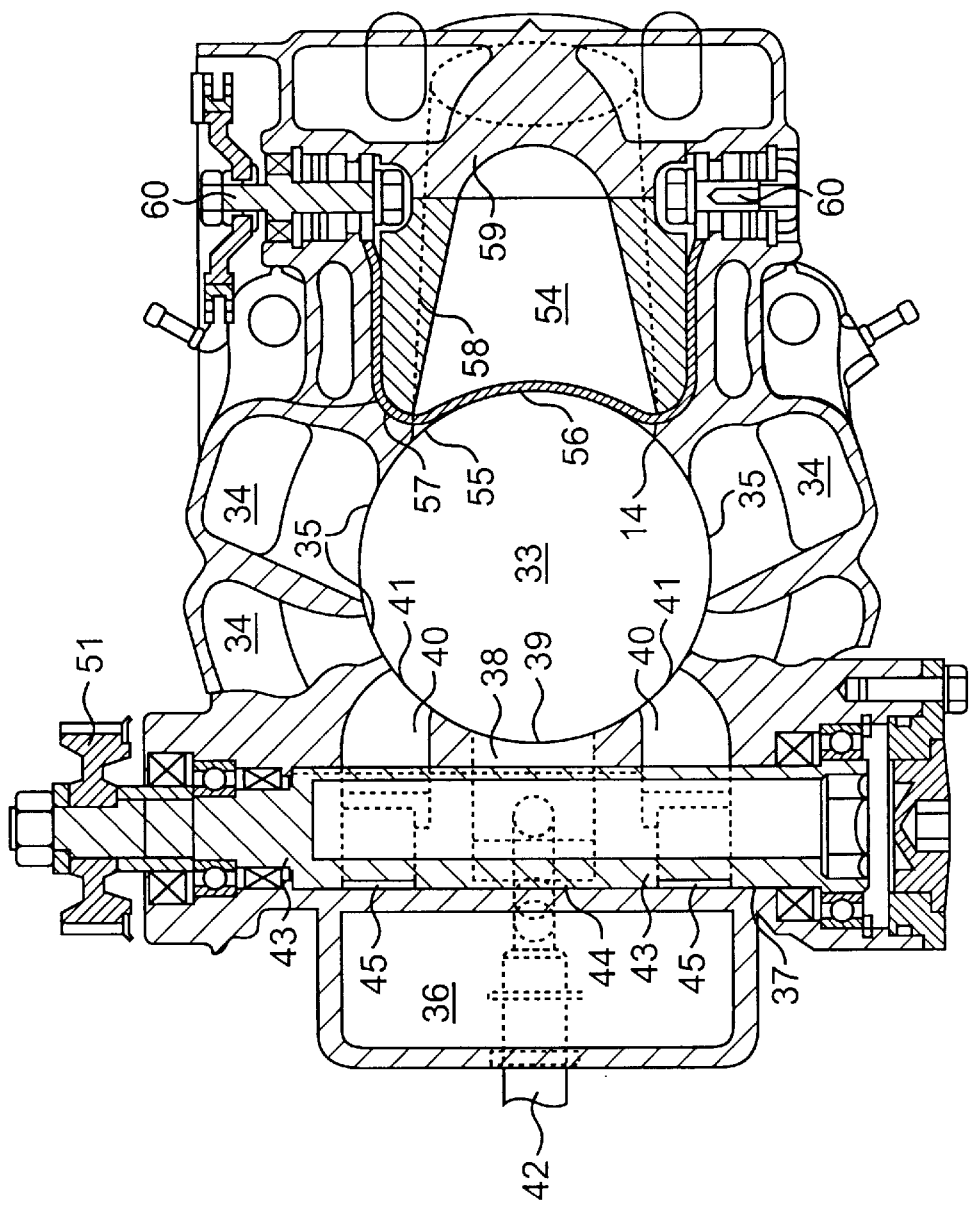
FIG. 5 is a top plan view in section taken along line V—V of FIG. 3.
Figure 6:
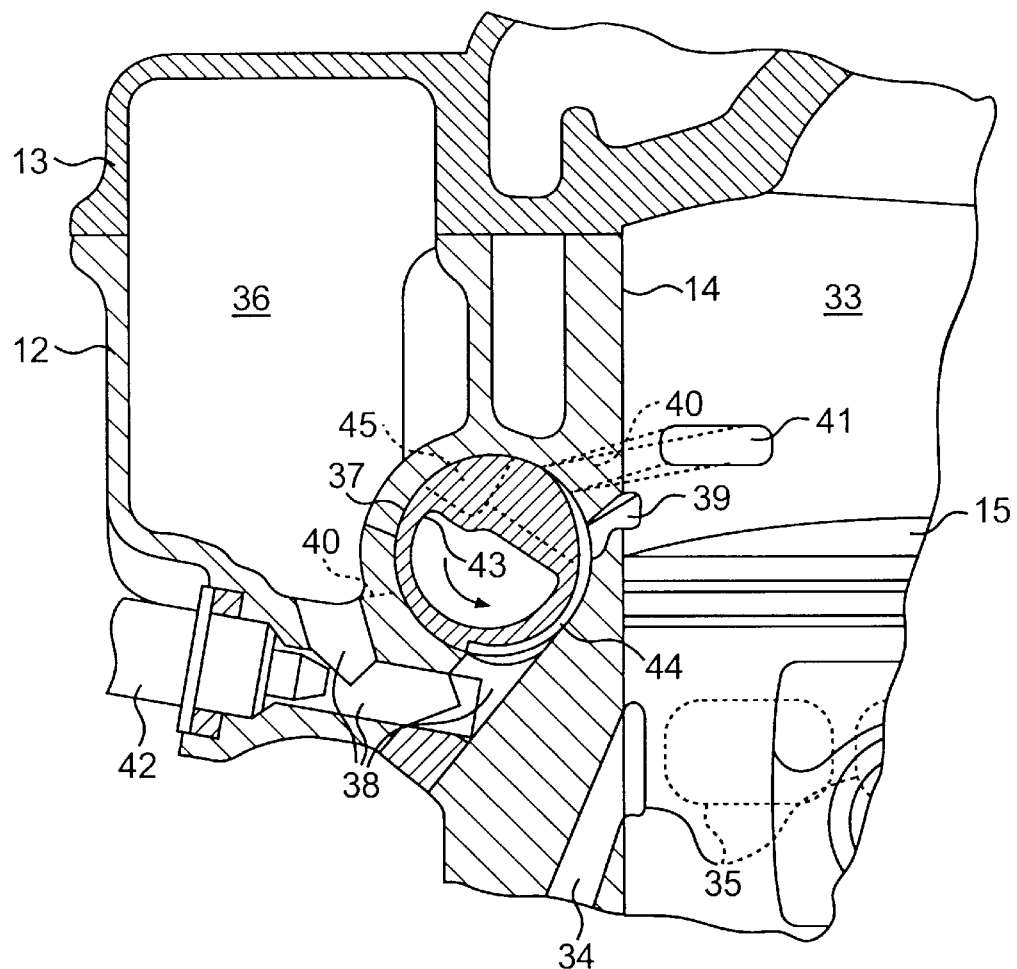
FIG. 6 is an enlarged side elevational view in longitudinal section illustrating a substantial part of FIG. 3.
Figure 7:
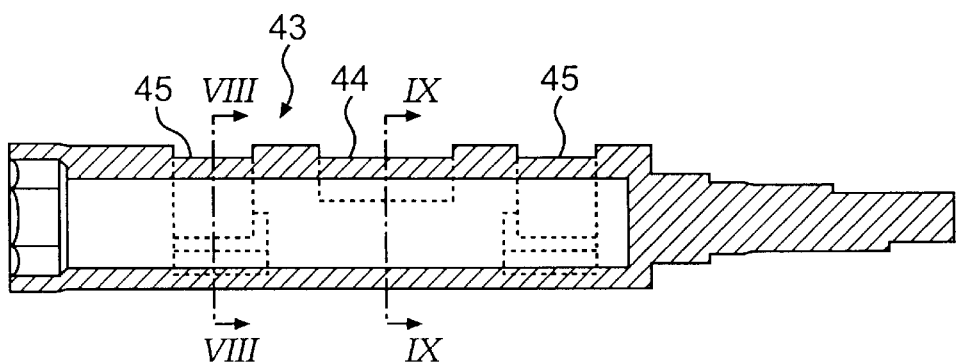
FIG. 7 is a side elevational view in longitudinal section illustrating an air intake control valve.
Figure 8:
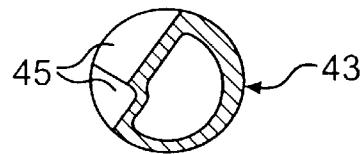
FIG. 8 is a cross sectional view taken along line VIII—VIII of FIG. 7.
Figure 9:
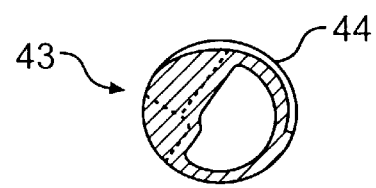
FIG. 9 is a cross sectional view taken along line IX—IX of FIG. 7.

A high pressure chamber 36 is positioned at the forward end of the vehicle body and formed at the upper part of the cylinder block 12 and the cylinder head 13. A cylindrical valve chamber 37 is positioned at a midway part between the high pressure chamber 36 and the combustion chamber 33, directed in parallel with the crankshaft 16 and formed at the cylinder head 13. As shown in FIG. 5, the rich mixture gas supplying passage 38 communicated with the combustion chamber 33 is formed at the cylinder head 13 from the bottom part of the high pressure chamber 36 through the valve chamber 37. A pressure air feeding passage 40 communicating between the combustion chamber 33 and the high pressure chamber 36 is positioned above the rich mixture gas supplying passage 38 and formed at the cylinder head 13. The pressure air feeding opening 41 of the pressurized air feeding passage 40 is arranged near the top dead center position, rather than the rich mixture gas supplying opening 39 of the rich mixture gas supplying passage 38.

Further, the rich mixture gas supplying passage 38 is provided with a fuel injection valve 42 for use in injecting fuel toward the rich mixture gas supplying opening 39.

Additionally, the intake control valve 43 is rotatably fitted to the valve chamber 37. The intake control valve 43 is formed with an arcuate rich mixture gas supplying recess 44 communicated with the rich mixture gas supplying passage 38 such that it may be opened or closed. At the same time, two pressurizing air feeding recesses 45 communicated with the pressurized air feeding passage 40 such that it may be opened or closed are formed at both sides of the rich mixture gas supplying recess 44.

In addition, the upper part of the high pressure chamber 36 and the regulator 46 are connected by a pipe 47. The regulator 46 detects pressure within the high pressure chamber 36 and controls injection of fuel with the fuel injection valve 42 in correspondence with the detected pressure.

Furthermore, as shown in FIG. 4, the valve drive gear 48 is integrally fitted on the same axis of the balancer 26 at the right end of the balancer. A valve driven gear 49 (having the same diameter and the same number of teeth as those of the valve drive gear 48) engaged with the valve drive gear 48 is positioned above the balancer 26 and rotatably pivoted to the crankcase 11. A valve drive toothed pulley 50 integral with the driven gear 49. A valve driven toothed pulley 51, having the same diameter and the same number of teeth as those of the valve drive toothed pulley 50, is fitted to the right end of the intake control valve 43. A toothed endless belt 52 is applied over the valve drive toothed pulley 50 and the valve driven toothed pulley 51. The intake control valve 43 is directed in the same direction as that of the crankshaft 16 and rotationally driven at the same number of rotations as that of the crankshaft 16. In addition, an idler pulley 53 is oscillatably pivoted to the crankcase 11 and abutted against the toothed endless belt 52 so as to eliminate looseness of the toothed endless belt 52.

Furthermore, as shown in FIG. 3, an exhaust gas passage 54 is arranged at a rearward side of the vehicle body while being faced against the scavenging opening 35. An exhaust gas control valve 56 is arranged near an exhaust gas opening 55 of the exhaust gas passage 54. The exhaust control valve 56 is positioned between a recessed part 57 with an arcuate longitudinal section formed in the cylinder block 12 and an exhaust passage member 58 formed in substantially the same longitudinal shape as that of the recess 57. The exhaust passage member is fitted in a clearance having substantially the same clearance width as the recess 57. A base end of the exhaust control valve 56 is integrally fitted on a rotation axis 60 rotatably pivoted to the exhaust passage member 58. An exhaust pipe fixing member 59 is integrally connected to the exhaust passage member 58. The rotation axis 60 is connected to an exhaust control servo motor (not shown). The exhaust control servo motor is operated with a control signal outputted from a CPU (not shown) in reference to a map of exhaust opening rate with a degree of opening of the throttle valve 31 and the number of rotation of the single 2-stroke cycle internal combustion engine 8 being applied as independent variables. Furthermore; the rotation axis 60 is oscillated such that the most suitable exhaust opening rate adapted for an operating state may be attained.

As shown in FIGS. 1 and 2, an exhaust pipe 61 connected to the exhaust passage 54 shown in FIG. 3 is directed toward a rearward part of the vehicle body. The front end of the exhaust expansion chamber 62 directed in a forward direction is connected to the rear end of the exhaust pipe 61 as shown in FIGS. 1 and 2. A communicating pipe 63 is branched from the front part 62a of the exhaust expansion chamber 62. An exhaust gas purifying catalyst device 64 is positioned at the communicating pipe 63. After the communicating pipe 63 is extended in a rearward direction, it is bent in a forward direction by 180 and further at a forward part it is bent by 180 in a rearward direction and connected to a muffler 65.

Furthermore, as shown in FIG. 4, a cooling water pump 66 is arranged at the right side of the crankcase 11. The pump drive gear 67 is integral with the crankshaft 16 and the pump driven gear 68 is integral with a rotor of the cooling water pump 66. The gears 67 and 68 are engaged with each other. Furthermore, the cooling water pump 66 is rotationally driven as the crankshaft 16 is rotated.

The cylinder head 13 is provided with a spark plug 69 of which an electrode part is projected into the combustion chamber 33.

Since the single cylinder 2-stroke cycle internal combustion engine 8 shown in FIGS. 1 to 9 is constructed as described above, if the kick lever 24 is treaded or the starter motor 23 is rotated, the single cylinder 2-stroke cycle internal combustion engine 8 is started in operation to rotate in a counterclockwise direction as viewed in FIG. 3 (the clockwise direction in FIG. 4). Furthermore, the scavenging opening 35 is closed by the piston 15 as shown in FIG. 10 at the time of 120° before the top dead center (TDC) position, the mixture gas in the combustion chamber 33 is compressed, the compressed mixture gas is ignited by the spark plug 69 at a predetermined timing before the top dead center position, the crank chamber 29 continues to expand as the piston 15 is lifted up, and the exhaust gas is supplied into the crank chamber 29 through the suction passage 30.

In addition, after the scavenging opening 35 is closed, the rich mixture gas supplying recess 44 of the intake control valve 43 is positioned in the mixture gas supplying passage 38. The high pressure chamber 36 and the combustion chamber 33 are communicated with each other through the rich mixture gas supplying passage 38 and the rich mixture gas supplying recess 44. Gas is forcedly fed into the high pressure chamber 36 at a cycle before it is supplied into the combustion chamber 33 through the rich mixture gas supplying passage 38 and the rich mixture gas supplying recess 44. The fuel is injected from the fuel injection valve 42 into the rich mixture gas supplying passage 38 and the mixture gas is filled in the combustion chamber 33.

When the exhaust opening 55 is closed by an ascending piston 15, the pressurized air feeding recess 45 at the intake control valve 43 is positioned in the rich mixture gas supplying passage 38. The combustion chamber 33 and the high pressure chamber 36 are communicated with each other through the rich mixture gas supplying passage 38 and the pressurized air feeding recess 45. Gas in the combustion chamber 33 pressurized as the piston 15 is lifted up is started to be filled in the high pressure chamber 36. After this operation, also after the rich mixture gas supplying opening 39 is closed, the pressurized gas in the combustion chamber 33 is filled in the high pressure chamber 36 and then the filling of the gas from within the combustion chamber 33 into the high pressure chamber 36 is finished at 55° before the top dead center (TDC) position. The intake supplying operation is continued up to the top dead center (TDC) position and new intake gas is sucked into the crank chamber 29.

Further, the mixture gas in the combustion chamber 33 is ignited by the spark plug 69 near the top dead center (TDC) position. The piston 15 descends, the combustion gas in the combustion chamber 33 is expanded, the exhaust opening 55 is released at 85° after the top dead center (TDC) position, and the combustion gas flows from the exhaust opening 55 into the exhaust expansion chamber 62 through the exhaust passage 54. A pressure wave of the combustion gas in the exhaust expansion chamber 62 is reflected against the rear end wall of the exhaust expansion chamber 62 and reaches the exhaust opening 55, resulting in that an inertia effect of the exhaust gas as well as a blowoff effect is realized. As a result, a scavenging effect is increased and an output of the single cylinder 2-stroke cycle internal combustion engine 8 is improved.

In addition, the exhaust gas flowing into the exhaust expansion chamber 62 is not cooled in the exhaust expansion chamber 62, but immediately flows into the exhaust gas purifying catalyst device 64. Therefore, a high exhaust temperature is kept. The gas passes through the exhaust gas purifying catalyst device 64, resulting in an increase in exhaust purifying performance.

Furthermore, since the air cleaner 9, the suction passage 30, the throttle valve 31 and the intake part of the reed valve 32 or the like are arranged in front of the single cylinder 2-stroke cycle internal combustion engine 8, running air flowing from the forward side of the vehicle does not receive heat generated from the single cylinder 2-stroke cycle internal combustion engine 8. Furthermore, the air is fed smoothly into the crank chamber 29 of the crankcase 11, resulting in a high filling efficiency being attained.

Still further, the exhaust passage 54 is positioned more rearwardly than the combustion chamber 33, opened in a rearward direction. An exhaust system such as the exhaust pipe 61 connected to the exhaust passage 54, the exhaust expansion chamber 62, the communicating pipe 63, the exhaust gas purifying catalyst device 64, and the muffler 65 or the like is arranged more rearwardly than the single cylinder 2-stroke internal combustion engine, so that the exhaust system does not bypass near the side part of or the upper part and the lower part of the single cylinder 2-stroke cycle internal combustion engine 8. This results in no increase of the vehicle width, height or minimum ground height. Furthermore, the size of the off-road running saddle riding type vehicle 1 can be reduced and comfort can be increased.

In addition, the exhaust expansion chamber 62 elongating in a forward or a rearward direction is curved at its rearward part toward the center of the width of the vehicle. The communicating pipe 63 branched at the front part of the exhaust expansion chamber 62 is bent at a forward or a rearward part. The rear end of the communicating pipe 63 is connected to the muffler 65 and the exhaust gas purifying catalyst device 64 is placed at the communicating pipe 63, so that even if the exhaust system is arranged at the rear part of the vehicle more rearwardly than the single cylinder 2-stroke cycle internal combustion engine 8, a pipe length required in the exhaust system is sufficiently assured.

Furthermore, the high pressure chamber 36 is arranged in front of the combustion chamber 33. Even if the cylinder 14 is inclined forwardly, its degree of inclination is small, so that the rich mixture gas supplying passage 38 communicating from the high pressure chamber 36 to the combustion chamber 33 is not elongated as much, less amount of adhesion of fuel accumulated in the rich mixture gas supplying passage 38 extending from the high pressure chamber 36 to the combustion chamber 33 is found, the mixture gas is supplied stably from the high pressure chamber 36 to the combustion chamber 33 and at the same time a supplying responding characteristic of the mixture gas is high.

Additionally, since the intake control valve 43 is rotated near the rich mixture gas supplying opening 39 of the rich mixture gas supplying passage 38 from the crank chamber 29 toward the combustion chamber 38, a flowing direction of the fuel and the high pressure gas is coincided with a rotating direction of the intake control valve 43 end the fuel and the high pressure gas are supplied smoothly into the combustion chamber 33 and a fuel supplying amount is properly controlled.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A 2-stroke cycle internal combustion engine in a saddle riding type vehicle comprising:
   a combustion chamber;
   a high pressure chamber;
   a communicating passage for communicating said combustion chamber with said high pressure chamber;
   an intake control valve for opening and closing said communicating passage;
   a fuel supplying device for supplying fuel to said combustion chamber through said communicating passage and said intake control valve;

a crankshaft, the engine mounted on the vehicle with said crankshaft extending in a width direction of the vehicle;

a cylinder, said cylinder slightly inclined toward a forward side of the vehicle, said communicating passage extends from said cylinder to said high pressure chamber, said high pressure chamber located forward of said cylinder;

an opening of said communicating passage to the combustion chamber is arranged nearer to a top dead center position than a scavenging port, said intake control valve is arranged near said opening of said communicating passage; and an exhaust pipe communicating with an exhaust passage of said engine and an exhaust expansion chamber are located rearward of said cylinder.

2. The 2-stroke cycle internal combustion engine according to claim 1, further comprising said exhaust expansion chamber communicating with said exhaust passage of said engine, said exhaust expansion chamber extending toward a rearward end of the vehicle.

3. The 2-stroke cycle internal combustion engine according to claim 2, further comprising an exhaust communicating pipe communicating with an upstream side of said exhaust expansion chamber, said exhaust communicating pipe communicating with a muffler at a downstream end thereof.

4. The 2-stroke cycle internal combustion engine according to claim 3, further comprising an exhaust purifying catalyst device located in said exhaust communicating pipe between said exhaust expansion chamber and said muffler.

5. The 2-stroke cycle internal combustion engine according to claim 3, wherein said exhaust pipe, said exhaust communicating pipe, and said exhaust expansion chamber are entirely located rearwardly of said engine in said vehicle.

6. The 2-stroke cycle internal combustion engine according to claim 1, further comprising said exhaust pipe extending between said exhaust passage and said exhaust expansion chamber, and wherein said exhaust passage of said engine is located at a rear side of said engine.

7. The 2-stroke cycle internal combustion engine according to claim 1, wherein said communicating passage and said intake control valve are located in a cylinder block of the engine.

8. A 2-stroke cycle internal combustion engine in a vehicle comprising:

a combustion chamber;

a high pressure chamber;

a communicating passage for communicating said combustion chamber with said high pressure chamber;

an intake control valve for opening and closing said communicating passage;

a fuel supplying device for supplying fuel to said combustion chamber through said communicating passage and said intake control valve;

a cylinder, said high pressure chamber and said intake control valve are arranged forward of said cylinder in the vehicle;

an exhaust expansion chamber communicating with an exhaust passage of said engine, said exhaust expansion chamber extending toward a rearward end of the vehicle;

an exhaust communicating pipe communicating with an upstream side of said exhaust expansion chamber, said exhaust communicating pipe communicating with a muffler at a downstream end thereof; and an exhaust purifing catalyst device located in said exhaust communicating pipe between said exhaust expansion chamber and said muffler.

9. The 2-stroke cycle internal combustion engine according to claim 8, further comprising an exhaust pipe extending between said exhaust passage and said exhaust expansion chamber, and wherein said exhaust passage of said engine is located at a rear side of said engine.

10. The 2-stroke cycle internal combustion engine according to claim 9, wherein said exhaust pipe, said exhaust communicating pipe, and said exhaust expansion chamber are entirely located rearwardly of said engine in said vehicle.

11. The 2-stroke cycle internal combustion engine according to claim 8, further comprising a crankshaft of said engine extending in a width direction of the vehicle.

12. The 2-stroke cycle internal combustion engine according to claim 8, further comprising a cylinder formed in said engine, said cylinder being slightly inclined toward a forward side of the vehicle, and wherein said communicating passage extends from said cylinder to said high pressure chamber, said high pressure chamber located forward of said cylinder in said engine.

13. The 2-stroke cycle internal combustion engine according to claim 8, wherein said communicating passage and said intake control valve are located in a cylinder block of the engine.

14. A saddle riding type vehicle comprising:

a 2-stroke cycle internal combustion engine;

a combustion chamber formed in said engine;

a high pressure chamber formed in said engine;

a communicating passage for communicating said combustion chamber with said high pressure chamber;

an intake control valve for opening and closing said communicating passage;

a fuel supplying device for supplying fuel to said combustion chamber through said communicating passage and said intake control valve;

a crankshaft, the engine mounted on the vehicle with said crankshaft extending in a width direction of the vehicle;

a cylinder, said cylinder slightly inclined toward a forward side of the vehicle, said communicating passage extends from said cylinder to said high pressure chamber, said high pressure chamber located forward of said cylinder;

an opening of said communicating passage to the combustion chamber is arranged nearer to a top dead center position than a scavenging port, said intake control valve is arranged near said opening of said communicating passage; and an exhaust pipe communicating with an exhaust passage of said engine and an exhaust expansion chamber in communication with said exhaust pipe are entirely located rearward of said cylinder.

15. The saddle riding type vehicle according to claim 14, further comprising said exhaust expansion chamber communicating with said exhaust passage of said engine, said exhaust expansion chamber extending toward a rearward end of the vehicle.

16. The saddle riding type vehicle according to claim 15, further comprising an exhaust communicating pipe communicating with an upstream side of said exhaust expansion chamber, said exhaust communicating pipe communicating with a muffler at a downstream end thereof.

17. The saddle riding type vehicle according to claim 16, further comprising an exhaust purifying catalyst device located in said exhaust communicating pipe between said exhaust expansion chamber and said muffler.

18. The saddle riding type vehicle according to claim 14, further comprising said exhaust pipe extending between said exhaust passage and said exhaust expansion chamber, and wherein said exhaust passage of said engine is located at a rear side of said engine.

19. The 2-stroke cycle internal combustion engine according to claim 14, wherein said communicating passage and said intake control valve are located in a cylinder block of the engine.

* * * * *